Figure 1:
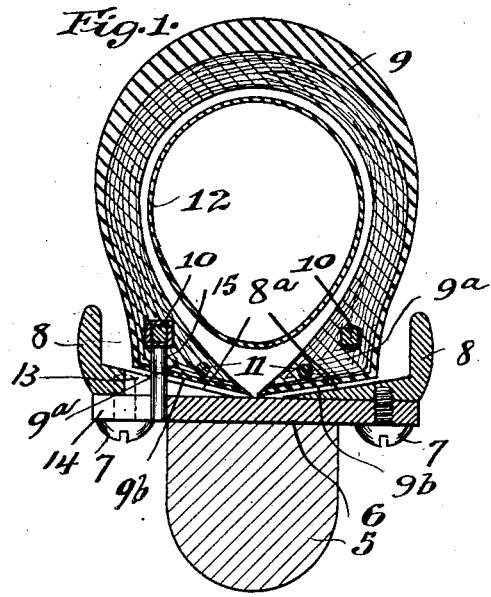

No. 779,730. PATENTED JAN. 10, 1905.
J. NEARY.
VEHICLE TIRE.
APPLICATION FILED MAY 28, 1904.

3 SHEETS—SHEET 1.

Witnesses,

Inventor,
John Neary
By Offield, Towle & Linthicum
Attys.

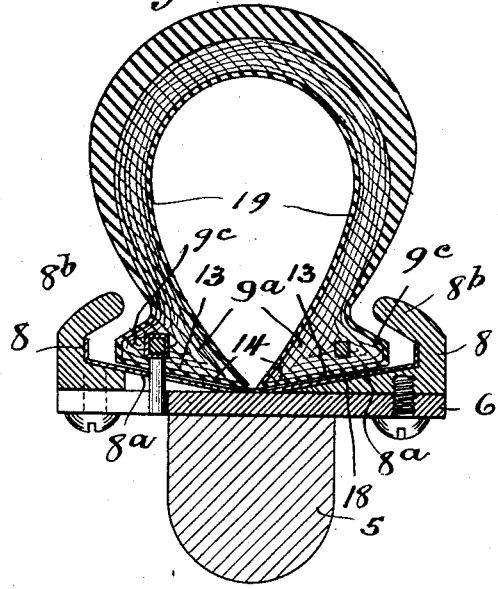
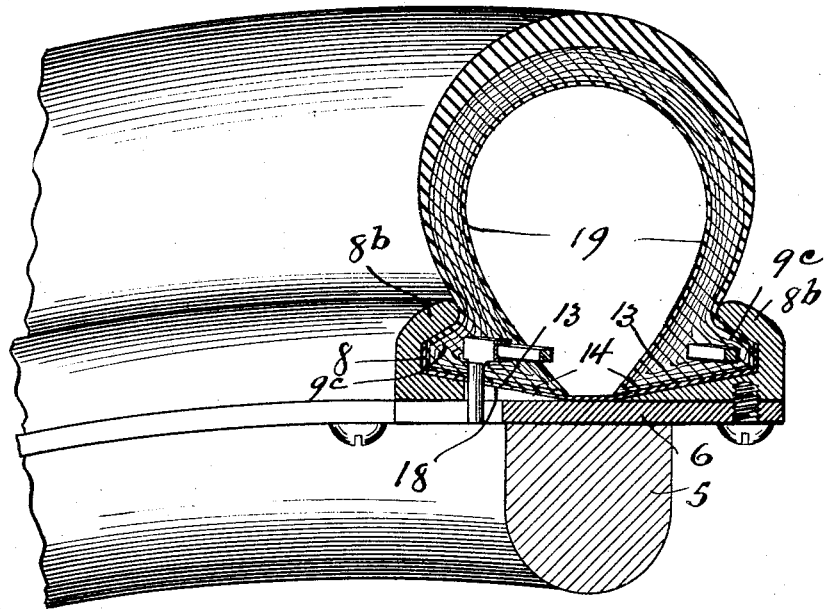

No. 779,730. PATENTED JAN. 10, 1905.
J. NEARY.
VEHICLE TIRE.
APPLICATION FILED MAY 28, 1904.
3 SHEETS—SHEET 3.
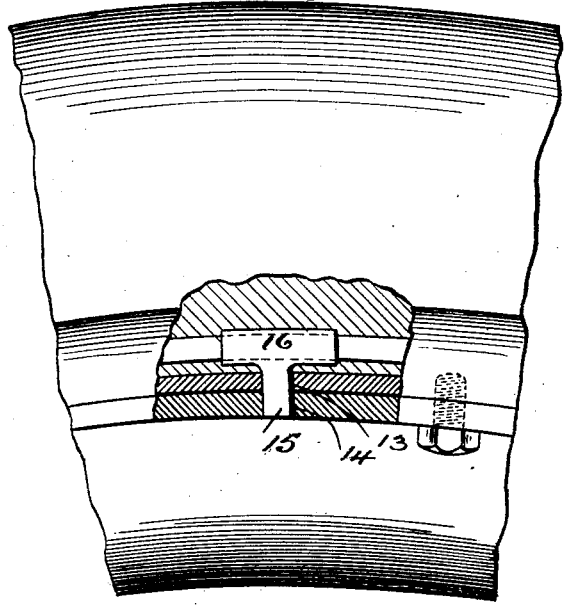
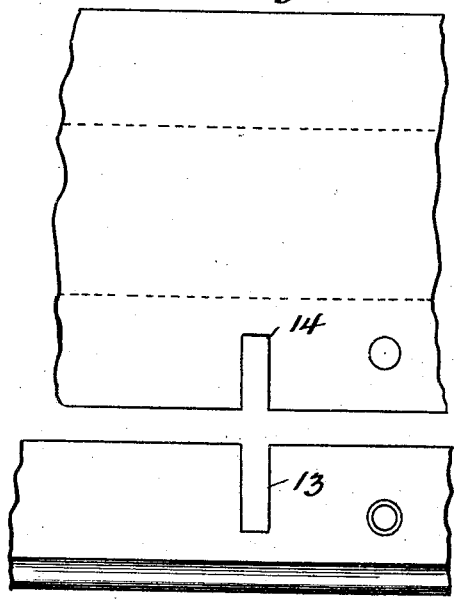
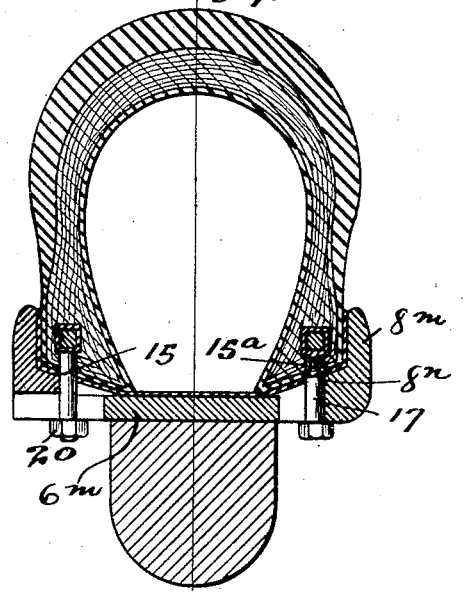
Witnesses:
F. S. Mann,
S. N. Pond.
Inventor:
John Neary,
By Offield, Towle & Linthicum
Att'ys.

No. 779,730. Patented January 10, 1905.

UNITED STATES PATENT OFFICE.

JOHN NEARY, OF KOKOMO, INDIANA, ASSIGNOR TO KOKOMO RUBBER COMPANY, OF KOKOMO, INDIANA, A CORPORATION OF INDIANA.

VEHICLE-TIRE.

SPECIFICATION forming part of Letters Patent No. 779,730, dated January 10, 1905.

Application filed May 28, 1904. Serial No. 210,252.

*To all whom it may concern:*

Be it known that I, JOHN NEARY, a citizen of the United States, residing at Kokomo, in the county of Howard and State of Indiana, have invented certain new and useful Improvements in Vehicle-Tires, of which the following is a specification.

My invention relates to pneumatic tires for vehicles, and has reference more particularly to the heavy tires employed on the wheels of automobiles and motor-vehicles generally.

The principal object of the invention is to provide an improved means for securing the tire upon the rim which shall combine simplicity of construction with strength and efficiency in operation and at the same time render the matter of applying and removing the tire a simple and easily-performed operation.

Another object of my invention is to provide an improved means for preventing creeping of the tire on the rim when partially or wholly deflated to prevent injury to the valve-stem and inner tube.

To these ends a leading feature of my invention consists of a tire and its seating and fastening means having as the chief novel and distinguishing characteristics a broad transversely-flat rim in association with side flanges removably secured to one or both edges thereof and having wedge-shaped bases which point inwardly of the rim, presenting oppositely-inclined outer surfaces to seat the tire, in combination with a longitudinally-split hollow tire-body having its inner peripheral portion or base formed to seat upon the wedge-shaped bases of the flanges and under the internal pressure of the contained air be expanded into a close fit with the latter, at the same time drawing the fastening-wires outwardly and into a taut holding position upon the rim.

Another feature of the invention resides in the employment, either with or without the specially-formed side flanges above referred to, of anticreeping devices in the nature of projections extending from the base of the tire into or through its seat on the rim and so formed and arranged as to lock the tire against longitudinal creeping when wholly or partially deflated, while not interfering with the ready application of the tire to the rim.

My invention in two practicable forms thereof is illustrated in the accompanying drawings, wherein—

Figure 2:
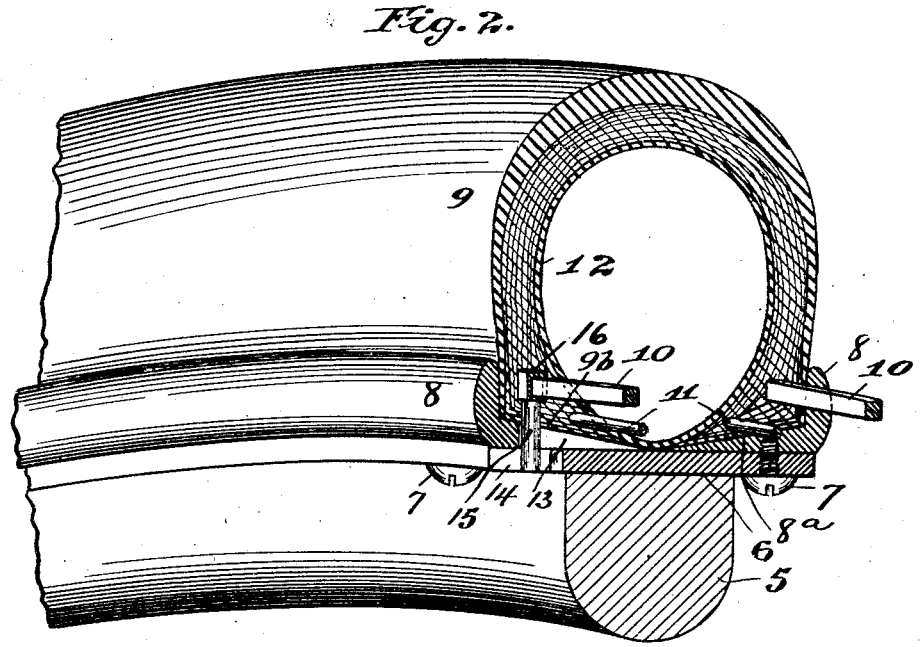

Figure 1 is a cross-sectional view of the tire and its rim when deflated. Fig. 2 is a perspective view in cross-section at one end of the same in an inflated position. Fig. 3 is a view similar to Fig. 1, showing a modified form wherein the inner air-holding tube may be omitted. Fig. 4 is a view corresponding to Fig. 2 of the form of tire shown in Fig. 3. Fig. 5 is a side elevational view, partly broken away to show the anticreeping device. Fig. 6 is a top plan view of a portion of the rim and side flange, showing the parts separated and transversely slotted for the accommodation of the anticreeping device; and Fig. 7 is a cross-sectional view in two different transverse planes, illustrating a modification wherein one of the side flanges is integral with the rim and showing also a modified construction of fastener to prevent creeping.

Referring to the drawings, 5 designates the felly of a wheel, and 6 the rim-base, which, as shown in all the figures of the drawings, is a broad transversely-flat metal band affording a wide substantial base to the tire-body.

Secured to the opposite edges of the base 6, as by the screws 7, are a pair of side rims or flanges 8, and it will be observed as constituting a leading feature of the present invention that the inwardly-extending horizontal base portions of these members are made wedge-shaped in cross-section, being inclined downwardly and inwardly on their upper faces $8^a$ in a direction transversely of the rim-base 6.

9 designates the shell of the tire-body, which is longitudinally split on the central line of its base, the two halves $9^a$ of the base being flat on their outer faces, as shown at $9^b$, and inclined at substantially the same degree from the horizontal as the upper faces $8^a$ of the wedge-shaped flange-bases, so as to engage and seat snugly upon the latter when the tire is inflated. Within the adjacent marginal portions of the tire are embedded a series of fastening wires or bands 10 and 11, and within the tire 9 is the usual inner air-retaining tube 12.

As a means for preventing creeping of the tire on the rim when the former is partially or wholly deflated I transversely slot the wedge-shaped bases of the side flanges inwardly from their inner edges at intervals, as shown at 13, and also preferably provide registering slots 14, extending inwardly from the outer edges of the rim. In the upper or both of these slots lie a series of bolts or pins 15, which at their upper ends are secured to the fastening wires or bands 10 in any suitable way, as by means of the sleeves 16, and at their lower ends project from the base of the tire.

The several parts are shown in deflated position in Fig. 1 and in inflated position in Fig. 2. In applying the tire to the rim the two sides of the split tire-body are distended sufficiently to admit the flat rim between them, whereby the tire is caused to envelop the rim, and the two halves of the split base are then thrust inwardly over the edges of the rim, the pins or bolts 15, where these are employed, entering the slots 14. The annular side flanges, each of which may be made in sections, if desired, are then applied by inserting their wedge-shaped bases beneath the base of the tire on either side, the slots 13 engaging the bolts, and are then secured to the rim-base 6 by the screws 7. Upon applying the internal air-pressure the side walls of the tire-body are distended, forcing the inner marginal portions $9^a$ of the base into snug seating engagement with the vertical and inclined faces of the side flanges and their wedge-shaped bases, as clearly shown in Fig. 2, which action also carries the retaining-wires 10 and 11 outwardly into positions in which they snugly bind the base of the tire-body upon the troughed face of the rim.

Figs. 3 and 4 illustrate a modification wherein the side flanges 8, in addition to the wedge-shaped bases already described, are provided at their outer ends with inwardly-turned projections $8^b$ after the fashion of clencher-rims, and the twin halves of the tire-base are made correspondingly wedge-shaped on their outer faces, as shown at $9^c$, to snugly fit between the oppositely-inclined projections $8^b$ and bases $8^a$ of the rim-flanges 8. In connection with this construction I have shown a means for dispensing with the usual inner air-retaining tube, which consists in lining the inner surface of the members 8 and the outer surface of the rim 6 lying between them with a layer of soft rubber or equivalent material (indicated at 18) and extending the rubber surface of the tire-shell in a thin layer entirely around the rim-engaging surface of the base, as shown at 19, and also over the inner surface of the shell, so as to render the inner wall of the shell and the interfitting surfaces of the tire-base and rim air-proof under the internal pressure by the intimate contact of substances capable of making an air-proof joint when forced together under sufficient pressure.

While I have shown the rim-base as provided with inwardly-sloping removable side flange members on either side, respectively, yet it will be understood that one of these members on one side might be made integral with the rim-base without departing from the principle of the invention or sacrificing any of the advantages thereof. Such a variation I have illustrated in Fig. 7, wherein one of the side flanges $8^m$, with its slotted wedge-shaped base $8^n$, is made integral with the rim $6^m$. In this case the tire is introduced to the rim by carrying both halves of the base over the flat free edge of the rim, (shown at the left,) for which purpose the anticreeping studs or bolts $15^a$ extend only substantially flush with the rim-engaging surface of the tire-base on that side of the rim having the integral side flange, as shown, and said bolts $15^a$ are internally threaded to receive fastening-bolts 17, inserted from beneath the rim through the slot in the integral rim and flange base. This style of two-part anticreeping-bolt may be substituted for the bolts 15, hereinbefore described in the constructions shown in the other figures of the drawings, if desired, or, as shown at the left in Fig. 7, the bolts 15 may be extended beneath or within the rim and provided with threaded ends engaged by nuts 20.

The feature of the anticreeping devices in any of the forms hereinabove described, and shown in the drawings, are also capable of use to good advantage without the wedge-shaped base members of the side flanges.

While I have shown and described several mechanical embodiments of my invention, all of which are practical and useful, yet it is to be understood that these are by no means inclusive of all the detail forms and variations which the invention may comprehend, and consequently I do not limit the latter to such details except to the extent indicated in specific claims.

I claim—

1. The combination with a tire-body and a rim-base formed by a flat annular band, of side flange members on the opposite edges of said rim-base, said flange members each having an inwardly-extending base portion, wedge-shaped in cross-section, and pointing inwardly of the rim seated on said rim-base and engaging the tire on its outer inclined surface whereby to automatically crowd the edges of the tire inwardly of the rim, substantially as described.

2. The combination with a tire-body and a rim-base formed by a flat annular band, of side flange members secured to the opposite edges of said rim-base, said flange members each having an inwardly-extending base disposed transversely of the rim wedge-shaped in cross-section and oppositely-inclined tire-engaging surfaces, a radially-extending portion constituting a lateral abutment for the tire, and an inclined outer portion extending inwardly of the rim and constituting a clencher, substantially as described.

3. The combination with a tire-body and a rim-base formed by a flat annular band, of side flange members on the opposite edges of said rim-base having bases provided with inwardly and inversely inclined outer surfaces forming seats for the tire-base, and a lining of yielding material applied to said inclined surfaces and to the flat annular band between the inner edges of the inclines, substantially as described.

4. The combination with a rim-base formed by a flat annular band, of clencher-shaped side flange members removably secured to the opposite edges of said rim-base and having bases provided with inwardly and inversely inclined outer surfaces forming seats for the tire-base, a lining of yieldable material applied to the internal walls of said side flange members and to the flat annular band between said members, and a tire-body split longitudinally of its inner periphery or base and having its internal surface and also its rim and flange engaging portions provided with a surface covering of soft rubber engaging the lining of the rim, substantially as described.

5. The combination with a tire-body having continuous fastening-wires, and a flat rim, of a series of pins or studs secured to said fastening-wires and projecting inwardly through the base of the tire into the rim to hold the tire against creeping, substantially as described.

6. The combination with a tire-body having continuous fastening-wires and a rim having inversely-inclined tire-engaging surfaces convergent in a direction toward the radial center of the rim, of a series of pins or studs rigidly united to said fastening-wires and projecting inwardly through the base of the tire into the rim to hold the tire against creeping, substantially as described.

7. The combination with a tire-body and a transversely-slotted rim, of a series of pins or studs incorporated in the tire-body during the process of manufacture and projecting from the base of the latter into the slots of the rim to secure the tire against creeping longitudinally of the rim, substantially as described.

8. The combination with a tire-body and a rim-base formed by a flat annular band, of side flange members on the opposite edges of said rim-base having wedge-shaped bases secured to the latter and provided with inwardly and inversely inclined tire-engaging surfaces, and anticreeping devices anchored in the tire-body and extending through said flange-bases, substantially as described.

9. The combination with a tire-body and a rim-base formed by a flat annular band, of side flange members on the opposite edges of said rim-base having wedge-shaped bases secured to the latter and provided with inwardly and inversely inclined tire-engaging surfaces, and bolts anchored in the tire-body and extending through said rim and flange bases to prevent creeping of the tire-body, substantially as described.

10. The combination with a tire-body and a rim-base formed by a flat annular band transversely slotted inwardly from its opposite edges, of side flange members on the opposite edges of said rim-base having wedge-shaped bases secured to the latter and provided with inwardly and inversely inclined tire-engaging surfaces and with transverse slots adapted to register with the slots of the rim-base, and bolts anchored in the tire-body and passing through and slidingly engaging said slots of the rim and flange bases to prevent creeping of the tire-body, substantially as described.

JOHN NEARY.

Witnesses:
  B. C. LINCOLN,
  EDWIN ELLIS.